(12) United States Patent
Weber et al.

(10) Patent No.: US 10,781,724 B2
(45) Date of Patent: Sep. 22, 2020

(54) CAMSHAFT ADJUSTING SYSTEM HAVING CAMSHAFT ADJUSTERS WHICH ARE ARRANGED RADIALLY AND AXIALLY INSIDE ONE ANOTHER

(71) Applicant: Schaeffler Technologies AG & Co. KG, Herzogenaurach (DE)

(72) Inventors: Jurgen Weber, Erlangen (DE); Daniel Heise, Herzogenaurach (DE); Marco Hildebrand, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/514,249

(22) Filed: Jul. 17, 2019

(65) Prior Publication Data

US 2020/0080448 A1 Mar. 12, 2020

(30) Foreign Application Priority Data

Sep. 12, 2018 (DE) .......................... 10 2018 122 230

(51) Int. Cl.
*F01L 1/344* (2006.01)
*F01L 1/12* (2006.01)
(Continued)

(52) U.S. Cl.
CPC ............... *F01L 1/12* (2013.01); *F01L 1/3442* (2013.01); *F01L 2001/0475* (2013.01);
(Continued)

(58) Field of Classification Search
CPC . F01L 1/12; F01L 1/3442; F01L 1/344; F01L 1/34; F01L 1/047; F01L 2001/0475;
(Continued)

(56) References Cited

U.S. PATENT DOCUMENTS 7,827,945 B2 * 11/2010 Gregor .................... F01L 1/047
123/90.15
2009/0120388 A1 * 5/2009 Lee .......................... F01L 1/352
123/90.11
(Continued)

FOREIGN PATENT DOCUMENTS

DE 102016215679 A1 * 2/2018 ............. F16D 57/00
EP 3141711 3/2017
EP 3141711 A1 * 3/2017 ............. F01L 1/352

*Primary Examiner* — Devon C Kramer
*Assistant Examiner* — Kelsey L Stanek
(74) *Attorney, Agent, or Firm* — Volpe and Koenig, P.C.

(57) ABSTRACT

A camshaft adjusting system (1) is provided for a first camshaft (2) and a second camshaft (3) which are arranged concentrically with respect to one another, the second camshaft being arranged inside the first camshaft. A hydraulic camshaft adjuster (4) of the vane-cell type is set up for the adjustment of the first camshaft, and an electric camshaft adjuster (5) is set up for the adjustment of the second camshaft. A rotor contact flange (17) of an output ring (6) of the electric camshaft adjuster is arranged radially inside a first cover (23) of the hydraulic adjuster, the output ring which is equipped for the transmission of torque to the second camshaft is arranged at least partially radially and axially inside a rotor (7) of the hydraulic camshaft adjuster. A camshaft adjusting unit is also provided having a camshaft adjusting system of this type and two camshafts.

17 Claims, 2 Drawing Sheets

(51) Int. Cl.
*F16H 53/04* (2006.01)
*F01L 1/047* (2006.01)

(52) U.S. Cl.
CPC ........... *F01L 2001/34469* (2013.01); *F01L 2001/34493* (2013.01); *F01L 2001/34496* (2013.01); *F16H 53/04* (2013.01)

(58) Field of Classification Search
CPC ... F01L 2001/34469; F01L 2001/34496; F01L 2001/0537; F01L 2001/34423; F01L 2001/0478; F01L 2001/0473; F01L 2001/34493; F01L 2001/34486; F01L 2001/34479; F01L 2201/34423; F16H 53/04
USPC .............................. 123/90.15, 90.16, 90.17
See application file for complete search history.

(56) References Cited

U.S. PATENT DOCUMENTS

| | | | |
|---|---|---|---|
| 2010/0093453 A1* | 4/2010 | Myers | F01L 1/3442 464/160 |
| 2013/0306011 A1 | 11/2013 | Wigsten et al. | |
| 2014/0190435 A1* | 7/2014 | Wigsten | F01L 1/3442 123/90.17 |
| 2019/0353059 A1* | 11/2019 | Weber | F01L 1/34 |
| 2019/0353237 A1* | 11/2019 | Weber | F01L 1/3442 |

\* cited by examiner

CAMSHAFT ADJUSTING SYSTEM HAVING CAMSHAFT ADJUSTERS WHICH ARE ARRANGED RADIALLY AND AXIALLY INSIDE ONE ANOTHER

INCORPORATION BY REFERENCE

The following documents are incorporated herein by reference as if fully set forth: German Patent Application No. DE 10 2018 122 230.0, filed Sep. 12, 2019.

TECHNICAL FIELD

A camshaft adjusting system is provided for a first camshaft and a second camshaft which are arranged concentrically with respect to one another, the second camshaft being arranged inside the first camshaft, a hydraulic camshaft adjuster of the vane-cell type being set up for the adjustment of the first camshaft, and an electric camshaft adjuster being set up for the adjustment of the second camshaft. Furthermore, a camshaft adjusting unit having a camshaft adjusting system is also provided.

BACKGROUND

Camshaft adjusting systems for two camshafts which are arranged concentrically with respect to one another are already known from the prior art. Here, for example, there are differences in the type of the respective adjusters which can be both electric and hydraulic.

Thus, for example, EP 3 141 711 A1 discloses a double camshaft adjuster which is used for an internal combustion engine which has a crankshaft and a valve train which has a first and a second group of cams, it being possible for the phase of the cams in each group to be adapted relative to the phase of the crankshaft independently of the phase of the cams of the other group. The double adjuster has an electric first adjuster for actuating the first group of cams and a hydraulic second adjuster for actuating the second group of cams. The axially coupled construction which is shown here between the hydraulic and the electric adjuster is very intensive in terms of installation space, however.

US 2014/0190435 A1 discloses a variable camshaft adjuster with a first fluid transfer arrangement with a fluid transfer sleeve and/or with a multiplicity of pressurized fluid passages, and a fluid transfer plate with a multiplicity of pressurized fluid passages. Each passage extends, in order to be connected fluidically to a corresponding circumferentially arranged annular groove segment section for the selective connection to a camshaft adjuster of the vane-cell type in a manner which is dependent on an angular orientation of the fluid transfer sleeve during the rotation. Each passage which extends from a corresponding centrally arranged port is connected fluidically to a radially extending passage section and to an arcuately extending passage section.

US 2013/0306011 A1 discloses a variable camshaft adjuster for an internal combustion engine with a concentric camshaft, which camshaft adjuster can comprise a stator with a rotational axis. An outer rotor can rotate independently relative to the rotational axis of the stator. A combination of an external vane and a cavity can be associated with the external rotor, in order to define first and second external variable volume working chambers. A radially inner rotor can rotate relative to the rotational axis and independently of both the stator and the external rotor. A combination of an external vane and a cavity can be associated with the internal rotor, in order to define first and second internal variable volume working chambers. If the first and second, internal and external chambers are connected selectively to a source for pressurized fluid, the phase orientation of the external and internal rotors relative to one another and in relation to the stator is settable.

It is a disadvantage of the previously known systems that the angular adjustments of the first and the second camshaft (also called the intake and exhaust camshafts or the inner and outer shafts) via the adjusting system are dependent on one another. As a result, an increased adjusting range of the inner shaft for counteracting the outer shaft is required. This can firstly be implemented hydraulically only to a limited extent, and secondly the counteraction can prove intensive in terms of time and can be accompanied by a relatively great control fault.

SUMMARY

It is an object to avoid or at least mitigate the disadvantages from the prior art and, in particular, to provide a system which is favorable in terms of costs and installation space and, in particular, solves the disadvantages of the great adjusting range of the inner shaft, the time-intensive counteraction of the inner shaft and the faulty control accuracy.

This object is achieved by virtue of the fact that a rotor contact flange of an output ring of the electric camshaft adjuster is arranged radially inside a first cover, the output ring which is equipped for the transmission of torque to the second camshaft is arranged at least partially radially and axially inside a rotor of the hydraulic camshaft adjuster. Furthermore, the object is also achieved by way of a camshaft adjusting unit having a camshaft adjusting system and two camshafts which are arranged concentrically with respect to one another.

The integration of the electric adjuster into the hydraulic adjuster in the axial direction makes a particularly flat overall design possible. This therefore results in what is known as a four-shaft adjusting system of flat construction for separately controlling two camshafts which are arranged concentrically. Here, the four shafts correspond to the two camshafts, the output shaft of the electric motor and a drive shaft, such as the crankshaft.

Advantageous embodiments are described below and in the claims.

For instance, it is advantageous if the first camshaft can be adjusted independently of the second camshaft and vice versa. In this way, the outer shaft and the inner shaft can be adjusted independently of one another with respect to the crankshaft.

One advantageous embodiment provides that the output ring is mounted radially and/or axially in the rotor of the hydraulic camshaft adjuster. The output ring can be mounted, for example, by way of a radial bearing in the rotor of the hydraulic camshaft adjuster. As a result, the two adjusting ranges for the electric and hydraulic adjuster on the radial bearing are decoupled from one another.

It has been shown to be advantageous here if there is a plain bearing between the output ring and the rotor. Plain bearings are, in particular, bearings which save installation space radially, with the result that only a very small amount of radial installation space is required.

Furthermore, it is advantageous if the output ring has a step-like shape in longitudinal section.

It has been shown to be advantageous here if the output ring has a rotor contact flange which is oriented in the axial direction and an inner camshaft contact flange which is likewise oriented axially but points in the other direction.

Furthermore, it has been shown to be advantageous if the output ring has an internal toothing system which is in contact with an intermediate gear mechanism which can be moved by the electric camshaft adjuster.

Here, one particularly advantageous embodiment provides that the intermediate gear mechanism is designed or configured as what is known as a harmonic drive.

In order to ensure the required concentricity of the traction mechanism, a chain drive, a stator of the hydraulic camshaft adjuster is advantageously connected to a drive gear which can be connected by a chain drive to an outer shaft. Here, the concentricity is ensured by way of the external bearing.

In other words, a four-shaft adjusting system of flat design is provided for the separate control of two camshafts which are arranged concentrically, the output internal gear, that is to say the output ring, of the electric adjusting gear mechanism, that is to say of the electric camshaft adjuster, being mounted in the rotor of the hydraulic (camshaft) adjuster by a radial bearing, and the two adjusting ranges for the electric and the hydraulic adjuster on the radial bearing being decoupled. In this way, the axial integration of the electric adjuster into the hydraulic adjuster is made possible, as a result of which the system is particularly flat. Furthermore, the outer (cam)shaft and the inner (cam)shaft can be adjusted independently of one another with respect to the crankshaft. The required concentricity of the chain sprocket system with respect to the outer shaft can be maintained reliably by way of the external bearing. Furthermore, an electric/hydraulic system of this type makes particularly high adjusting speeds of the inner camshaft possible, even at very low temperatures or low temperatures of below 0° C.

BRIEF DESCRIPTION OF THE DRAWINGS

In the following text, embodiments will be described in greater detail with the aid of figures, in which one exemplary embodiment is shown and in which.

DETAILED DESCRIPTION

The figures are merely diagrammatic in nature and serve only for the comprehension of the embodiments. The same elements are provided with the same designations.

Figure 1:
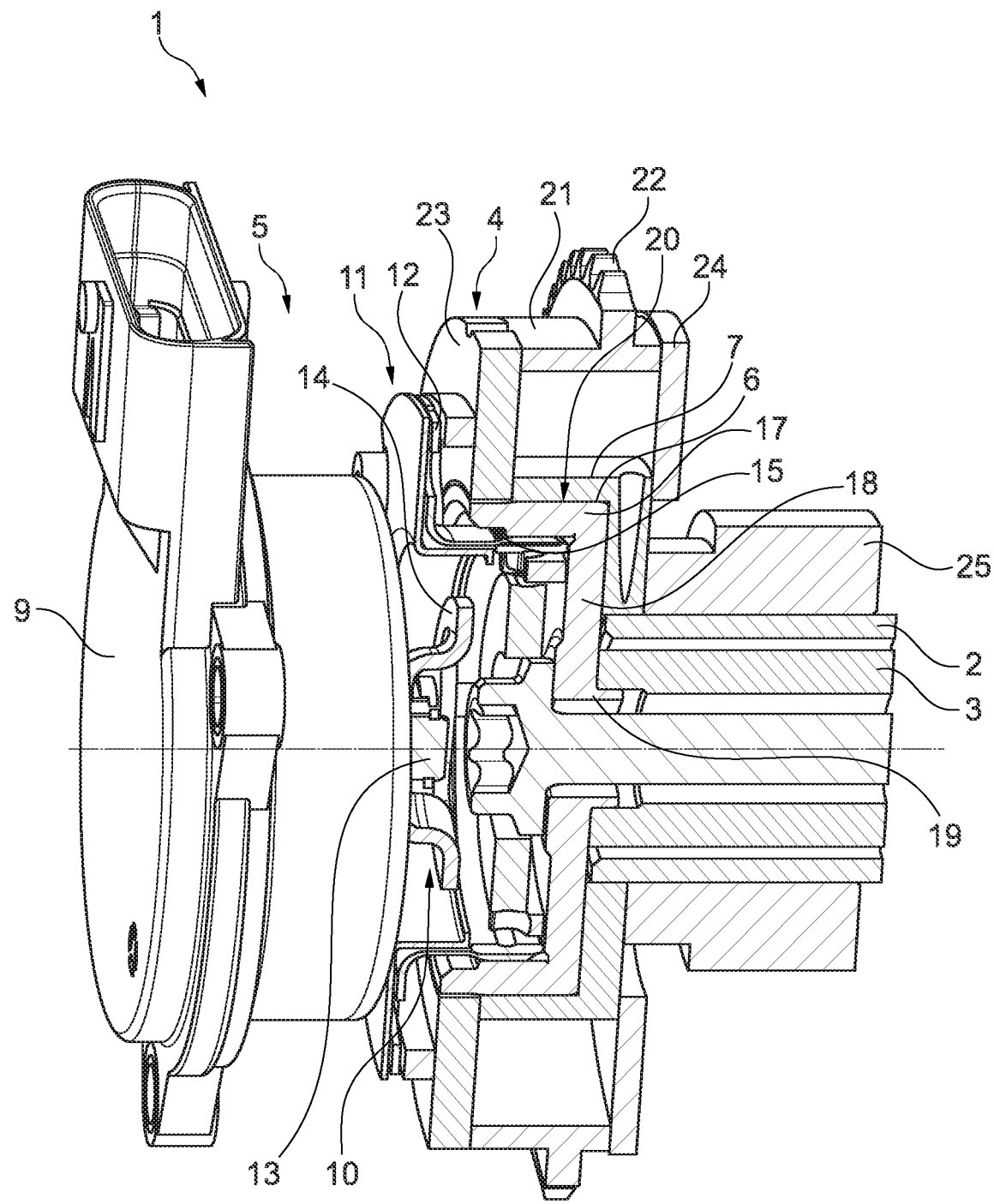
FIG. 1 shows a longitudinal sectional view of a camshaft adjusting system and two camshafts.

FIG. 1 shows a longitudinal sectional view of a camshaft adjusting system 1 for a first camshaft 2 and a second camshaft 3. The two camshafts 2, 3 are arranged concentrically with respect to one another, the second camshaft 3 being arranged radially inside the first camshaft 2. The camshaft adjusting system 1 has a hydraulic camshaft adjuster 4 which serves for the adjustment of the first camshaft 2, and an electric camshaft adjuster 5 which serves for the adjustment of the second camshaft 3.

Here, the two camshaft adjusters 4, 5 are arranged in such a way that an output ring 6 of the electric camshaft adjuster 5 is arranged radially and axially inside a rotor 7 of the hydraulic camshaft adjuster 4. In addition to the rotor 7, the first camshaft adjuster 2 also has a stator 8 (see FIG. 2) and is therefore a hydraulic camshaft adjuster of the vane-cell type.

The electric camshaft adjuster 5 is driven by an electric motor 9 and is connected to the latter via an Oldham coupling 10 and an intermediate gear mechanism 11. An Oldham coupling is a non-switchable, torsionally rigid coupling which can compensate for a radial offset of two parallel shafts. Therefore, a radial elastic deformation of a flanged bushing 12 of the intermediate mechanism 11 is compensated for by way of the coupling, with the result that a concentricity fault is not forwarded to an output shaft 13 of the electric camshaft adjuster 5. An Oldham coupling is known per se from the prior art, for which reason it is not described in greater detail at this point.

The intermediate gear mechanism 11 is configured as what is known as a harmonic drive, that is to say as a gear mechanism with an elastic transmission element 14 which transmits torque from the output shaft 13 to the flanged bushing 12. A gear mechanism of this type is also already known from the prior art, for which reason a detailed description of the intermediate gear mechanism 11 is dispensed with at this point.

Figure 2:
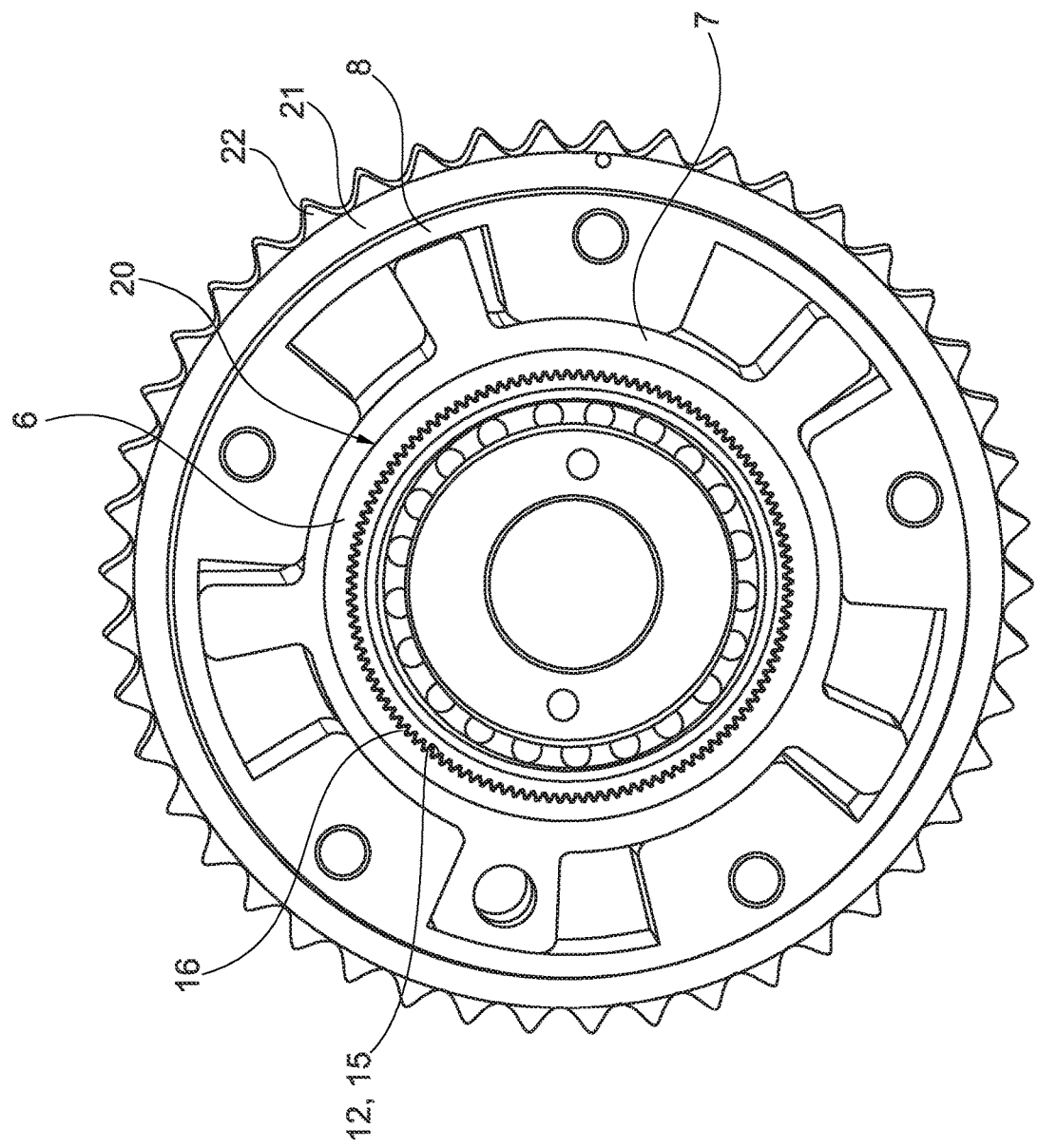
FIG. 2 shows a perspective partial view of the camshaft adjusting system.

The flanged bushing 12 has an external toothing system 15 which meshes with an internal toothing system 16 of the output ring 6 (see also FIG. 2). As an alternative, the output ring 6 is also called an output internal gear 6.

In longitudinal section, the output ring 6 has a shape of step-like configuration which is composed of three sections: a rotor contact flange 17, an intermediate section 18 and an inner camshaft contact flange 19. The intermediate section 18 is of ring-like configuration and connects the two flanges 17, 19 to one another. The rotor contact flange 17 extends from the radially outer end of the intermediate section 18 in the axial direction in a first direction, namely toward the intermediate gear mechanism 11, and the inner camshaft contact flange 19 extends from the radially inner end of the intermediate section 18 in the axial direction in a second direction, in an opposed manner with respect to the first direction, that is to say away from the intermediate gear mechanism 11.

A radial bearing or a plain bearing 20 is provided between the output ring 6 and the rotor 7, as a result of which the output ring 6 of the electric camshaft adjuster 5 can be rotated independently of and relative to the rotor 7 of the hydraulic camshaft adjuster 4. As a result, the angular adjustment of the two camshafts 2, 3 can be implemented completely independently of one another.

The stator 8 (see FIG. 2) is connected to a drive gear 21 which has an external toothing system 22. The drive gear 21 can be connected in a torque-transmitting manner via the external toothing system 22 via a chain drive to an outer shaft, for example a crankshaft (not shown). The drive gear 21 and the stator 8 are connected fixedly to a first cover 23 so as to rotate with it on a first side in the axial direction which faces the intermediate gear mechanism 11, and are connected fixedly to a second cover 24 so as to rotate with it on a second side in the axial direction which faces away from the intermediate gear mechanism 11. The rotor 7 is likewise arranged between the two covers 23, 24, but can also rotate relative to the latter. The rotor 7 is fixed by a bearing hub 25 on the outer (first) camshaft 2 in such a way that the rotor 7 cannot be displaced as viewed in the axial direction. To this end, the bearing hub 25 is connected to the outer camshaft 2 fixedly in axial terms and so as to rotate with it.

LIST OF DESIGNATIONS

1 Camshaft adjusting system
2 First camshaft

3 Second camshaft
4 Hydraulic camshaft adjuster
5 Electric camshaft adjuster
6 Output ring/output internal gear
7 Rotor
8 Stator
9 Electric motor
10 Oldham coupling
11 Intermediate gear mechanism
12 Flanged bushing
13 Output shaft
14 Elastic transmission element
15 External toothing system
16 Internal toothing system
17 Rotor contact flange
18 Intermediate section
19 Inner camshaft contact flange
20 Plain bearing
21 Drive gear
22 External toothing system
23 First cover
24 Second cover
25 Bearing hub

The invention claimed is:

1. A camshaft adjusting system for a first camshaft and a second camshaft which are arranged concentrically with respect to one another, the second camshaft being arranged inside the first camshaft, the camshaft adjusting system comprising:
a vane-cell type hydraulic camshaft adjuster configured to adjust the first camshaft, the hydraulic camshaft adjuster including a first cover and a rotor; and
an electric camshaft adjuster configured to adjust the second camshaft, the electric camshaft adjuster including:
an output ring having a rotor contact flange,
the rotor contact flange is arranged radially inside the first cover, and
the output ring is configured to transmit torque to the second camshaft arranged at least partially radially and axially inside the rotor.

2. The camshaft adjusting system as claimed in claim 1, wherein the hydraulic camshaft adjuster is configured to adjust the first camshaft independently of the second camshaft.

3. The camshaft adjusting system as claimed in claim 1, wherein the output ring is mounted at least one of radially or axially inside the rotor.

4. The camshaft adjusting system as claimed in claim 3, further comprising a plain bearing between the output ring and the rotor.

5. The camshaft adjusting system as claimed in claim 1, wherein the output ring is step-shaped in a longitudinal section.

6. The camshaft adjusting system as claimed in claim 1, wherein the output ring includes the rotor contact flange oriented in an axial direction, and an inner camshaft contact flange oriented axially and extending in an opposite direction from the rotor contact flange.

7. The camshaft adjusting system as claimed in claim 1, wherein the output ring includes an internal toothing system that is in contact with an intermediate gear mechanism that is configured to be moved by the electric camshaft adjuster.

8. The camshaft adjusting system as claimed in claim 7, wherein the intermediate gear mechanism comprises a harmonic drive.

9. The camshaft adjusting system as claimed in claim 1, wherein the hydraulic camshaft adjuster further comprises a stator that is connected to a drive gear by which a chain drive acting on the drive gear is adapted to be connected to the first camshaft.

10. A camshaft adjusting unit comprising:
a first camshaft;
a second camshaft arranged concentrically inside the first camshaft;
a vane-cell type hydraulic camshaft adjuster connected to the first camshaft and configured to adjust a rotational position of the first camshaft relative to a drive, the hydraulic camshaft adjuster including a first cover, a stator, and a rotor located within the stator; and
an electric camshaft adjuster connected to the second camshaft and configured to adjust a rotational position of the second camshaft relative to the drive and relative to the first camshaft, the electric camshaft adjuster including:
an output ring having a rotor contact flange,
the rotor contact flange is arranged radially inside the first cover, and
the output ring is configured to transmit torque to the second camshaft arranged at least partially radially and axially inside the rotor.

11. The camshaft adjusting unit of claim 10, wherein the hydraulic camshaft adjuster is configured to adjust the first camshaft independently of the second camshaft.

12. The camshaft adjusting unit as claimed in claim 10, wherein the output ring is mounted at least one of radially or axially completely inside the rotor.

13. The camshaft adjusting unit as claimed in claim 12, further comprising a bearing between the output ring and the rotor.

14. The camshaft adjusting unit as claimed in claim 10, wherein the output ring is step-shaped in a longitudinal section.

15. The camshaft adjusting unit as claimed in claim 10, wherein the output ring includes the rotor contact flange oriented in an axial direction, and an inner camshaft contact flange oriented axially and extending in an opposite direction from the rotor contact flange.

16. The camshaft adjusting unit as claimed in claim 10, further comprising an intermediate gear mechanism that is configured to be moved by the electric camshaft adjuster that engages an internal toothing of the output ring.

17. The camshaft adjusting unit as claimed in claim 16, wherein the intermediate gear mechanism comprises a harmonic drive.

* * * * *